US011830380B2

(12) United States Patent
Marvaniya et al.

(10) Patent No.: US 11,830,380 B2
(45) Date of Patent: Nov. 28, 2023

(54) SYSTEM AND METHOD FOR SOCIAL LEARNING UTILIZING USER DEVICES

(71) Applicant: International Business Machines Corporation, Armonk, NY (US)

(72) Inventors: Smitkumar Narotambhai Marvaniya, Bangalore (IN); Tejas Indulal Dhamecha, Bangalore (IN); Malolan Chetlur, Bangalore (IN); Renuka Sindhgatta, Bangalore (IN); Bikram Sengupta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1165 days.

(21) Appl. No.: 16/244,503

(22) Filed: Jan. 10, 2019

(65) Prior Publication Data
US 2020/0226942 A1    Jul. 16, 2020

(51) Int. Cl.
*G09B 5/12* (2006.01)
*G06N 20/10* (2019.01)
*G06F 16/903* (2019.01)
*G06F 40/174* (2020.01)
*H04L 65/401* (2022.01)

(52) U.S. Cl.
CPC .......... *G09B 5/125* (2013.01); *G06F 16/903* (2019.01); *G06F 40/174* (2020.01); *G06N 20/10* (2019.01); *H04L 65/401* (2022.05)

(58) Field of Classification Search
CPC ..... G09B 5/125; G09F 16/903; G09F 40/174; G06N 20/10; H04L 65/401
See application file for complete search history.

(56) References Cited

U.S. PATENT DOCUMENTS

| 9,620,028 | B2 | 4/2017 | Dozier et al. | |
|---|---|---|---|---|
| 10,701,067 | B1 * | 6/2020 | Ziraknejad | H04W 12/63 |
| 2009/0058611 | A1 * | 3/2009 | Kawamura | H04W 4/023 |
| | | | | 704/E11.001 |
| 2012/0315616 | A1 | 12/2012 | Fourman | |
| 2013/0004935 | A1 | 1/2013 | Smith et al. | |
| 2013/0204881 | A1 | 8/2013 | Su | |
| 2015/0019553 | A1 * | 1/2015 | Shaashua | H04L 67/10 |
| | | | | 707/737 |

(Continued)

OTHER PUBLICATIONS

M. Sharples et al., "Mobile Learning," Technology-Enhanced Learning, Jan. 2009, 20 pages.

(Continued)

*Primary Examiner* — Rasha S Al Aubaidi
(74) *Attorney, Agent, or Firm* — Ryan, Mason & Lewis, LLP

(57) ABSTRACT

Methods, systems and computer program products for automated learning are provided herein. A computer-implemented method includes authenticating a plurality of users for an automated learning session, wherein the plurality of users correspond to at least one device, and providing the automated learning session for the plurality of users. Providing the automated learning session comprises analyzing a plurality of learning models corresponding to one or more of the plurality of users, determining, based on the analysis, one or more activities to be performed by the plurality of users during the automated learning session, and executing the one or more activities on at least one device.

16 Claims, 15 Drawing Sheets

(56) References Cited

U.S. PATENT DOCUMENTS

| | | |
|---|---|---|
| 2015/0381722 A1 | 12/2015 | Lam et al. |
| 2016/0012738 A1 | 1/2016 | Shafigh |
| 2016/0012739 A1 | 1/2016 | Jafari |
| 2016/0148522 A1 | 5/2016 | Rowland et al. |
| 2016/0364391 A1* | 12/2016 | Eichenlaub ......... G06F 16/2468 |
| 2021/0084436 A1* | 3/2021 | Sutherland .......... H04L 63/0853 |

OTHER PUBLICATIONS

"Ways to Use Wearable Technology in Education," Edsys, http://www.edsys.in/ways-to-use-wearable-technology-in-education/, Nov. 24, 2016, 5 pages.

"Transform Static Content Into Interactive lessons with SMART Learning Suite," SMART Learning Suite—SMART Technologies, https://www.smarttech.com/en/Products/Education-Software/SMART-Learning-Suite, Jan. 9, 2019, 4 pages.

Nazmus Saquib, "Sensei: Sensing Educational Interaction," Massachusetts Institute of Technology, Sep. 2016, 68 pages.

Jennifer Roland, "The Benefits of Integrating Wearable Technology in Education," Integrating Wearable Technology in Education, https://insights.samsung.com/2015/09/17/the-benefits-of-integrating-wearable-technology-in-education/, Sep. 17, 2015, 7 pages.

Srishti Deoras, "Google Brings "On-Device" Artificial Intelligence With Android Wear 2.0, The First of Its Kind," https://www.analyticsindiamag.com/google-brings-device-artificial-intelligence-android-wear-2-0-first-kind, Feb. 23, 2017, 3 pages.

"Smartron, USC Collaborate on Research in Machine Learning, Wearables." https://indianexpress.com/article/technology/tech-news-technology/smartron-usc-collaborate-on-research-in-machine-learning-wearables-4856161, Sep. 22, 2017, 5 pages.

Andrew Heikkila, "Wearable Technology in eLearning: 3 Wearables That Have the Most Potential," https://elearningindustry.com/wearable-technology-in-elearning-3-wearables-potential, Sep. 27, 2017, 3 Pages.

Victoria Hoffman, "Get Your Wearable Technology eLearning Strategy in Gear," https://www.docebo.com/blog/wearable-technology-elearning-trend/, Jan. 9, 2019, 3 pages.

Dr. Lisa Harris et al., "Collaborative Social Learning: Rewards and Challenges In Mainstream Higher Education," International World Wide Web Conference Committee, Québec, Canada, Apr. 11-15, 2016, pp. 815-820.

Kalpani Manathunga et al.,"Collaborative Learning Orchestration Using Smart Displays and Personal Devices," Lecture Notes in Computer Science, vol. 9307, Barcelona, Spain, Nov. 26, 2015, pp. 596-600.

Eva Mårell-Olsson et al., "Designing for Collaborative Learning Expeditions by Using Wearable Technology and Smart Glasses," Computer-Supported Collaborative Learning, 11th International Conference on Computer Supported Collaborative Learning (CSCL), Gothenburg, Sweden, Jun. 7-11, 2015, vol. 2, pp. 689-690.

\* cited by examiner

SYSTEM AND METHOD FOR SOCIAL LEARNING UTILIZING USER DEVICES

FIELD

The present invention relates to automated learning systems, and more specifically, to enabling social learning by allowing users to interact using multiple devices.

BACKGROUND

In general, social learning is a cognitive process that takes place in a social context, where learning is able to take place by observations of behavior or actions of others and the results of such behavior or actions. Based on the observations and information derived from the observations, models are formed, which include decisions or conclusions about the behavior or actions.

Intelligent tutors are cognitive systems with complex models deciding on future sets of best actions to be used in an automated learning session. Intelligent tutors include complex artificial intelligence (AI) models which are utilized to navigate the learning sessions. The AI models may be connected online and/or through a cloud computing platform.

Given the complex set of interactions between users and systems involved in learning sessions with intelligent tutors, there are a number of challenges associated with implementing effective intelligent tutors. Such challenges can include, for example, enabling ubiquitous tutoring sessions, enabling an offline mode of operations, providing seamless continuity across different devices used for automated learning and their users, and enabling users in proximity to each other to utilize social learning to enhance their AI learning models and improve overall learning based on interactions with each other.

There is a need for systems and techniques which can address these challenges, and utilize user devices to take advantage of the benefits of social learning.

SUMMARY

Embodiments of the invention provide techniques for providing automated learning sessions, and more particularly, to enabling social learning during automated learning sessions across multiple devices.

According to an exemplary embodiment of the present invention, a computer-implemented method comprises authenticating a plurality of users for an automated learning session, wherein the plurality of users correspond to at least one device, and providing the automated learning session for the plurality of users. Providing the automated learning session comprises analyzing a plurality of learning models corresponding to one or more of the plurality of users, determining, based on the analysis, one or more activities to be performed by the plurality of users during the automated learning session, and executing the one or more activities on at least one device.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1A:
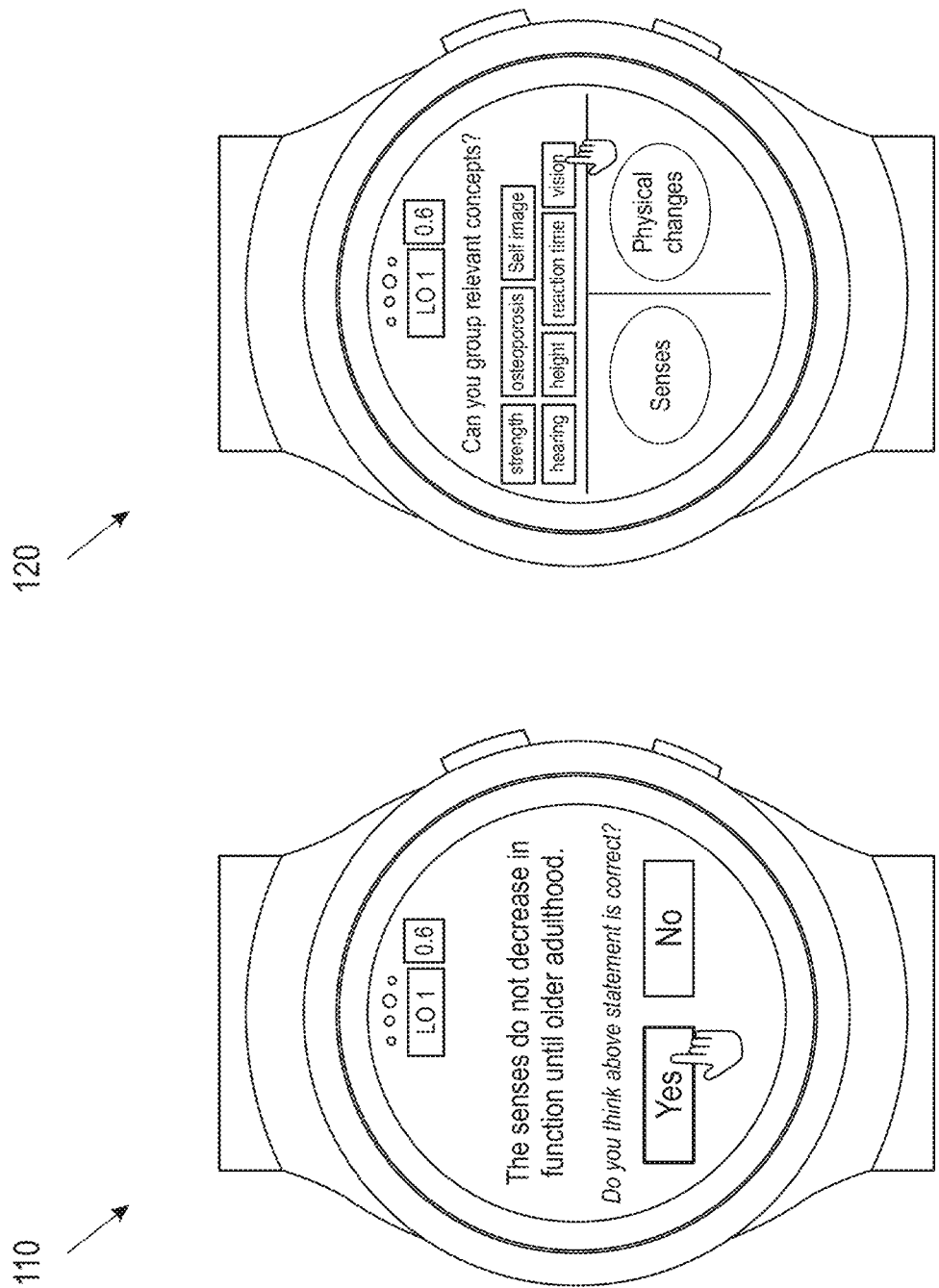
FIG. 1A depicts different automated learning session activities, according to an exemplary embodiment of the present invention.

Illustrative embodiments of the invention may be described herein in the context of illustrative methods, systems and devices for executing and responding to a query. However, it is to be understood that embodiments of the invention are not limited to the illustrative methods, systems and devices but instead are more broadly applicable to other suitable methods, systems and devices.

Embodiments of the present invention advantageously provide automated learning sessions (also referred to herein as "tutorlets" or "tutorlet sessions") to users on user devices, including, but not necessarily limited to, tablet computers, mobile telephones, smart watches, voice activated audio devices (e.g., Amazon Echo®, Google Home™, Apple HomePod™, IBM Watson®) or other types of processing devices. The automated learning sessions include a coherent group of tutor-like interactions between user and device that can be experienced independent of previous tutor sessions by a user. Automated learning sessions are determined by an automated learning session planning component ("tutorlet planner"). Using AI, the planning component identifies a next best set of coherent activities and/or actions for an automated learning session based on user interactions in previous learning sessions. The user interactions can include responses to questions or activities posed to a user during a previous learning session, and the identification of subsequent activities can be based on, for example, whether a user provided correct or incorrect responses to the questions or activities. In accordance with an embodiment of the present invention, the coherent activities are relatively short and concrete steps to be performed within a relatively short window of time.

The planning component generates a learning model, which can include, for example, a micro-domain model, micro-content, a micro-learning model and learning session activation rules. A synchronization module synchs (synchronizes) the learning model with user devices based on, for example, device capabilities, infrastructure and user context and user preferences. Tutorlet sessions are activated based on the type of device to make the interaction experience personalized, and based on infrastructure and context to improve the learning experience.

Learning sessions can be performed online or offline. If performed offline, user interactions and outcomes may be synched with online systems when possible using the synchronization module.

The methods and systems of the embodiments of the present invention also advantageously enable social learning through the execution of automated learning sessions on multiple user devices. According to one or more embodiments of the present invention, an authentication method for connecting multiple devices for enabling social learning is provided. The social automated learning sessions include a coherent group of tutor-like interactions between a plurality of users and their devices that can be experienced independent of previous tutor sessions by the plurality of users. Using AI, user groups sharing one or more common characteristics are identified so that users with common issues and/or objectives can collaborate during an automated learning session.

Embodiments of the present invention provide the advantage of automated learning sessions suitable for multiple user devices, such as tablet computers, mobile telephones, smart watches, and/or voice activated audio devices. Techniques in accordance with one or more embodiments utilize user responses/interactions for user verification when users have their own device or are sharing a device with another user for an automated learning session. Users can interact with multiple devices of multiple users by satisfying proximity constraints. Proximity can be, for example, within centimeters to less than 100 meters. However, the embodiments of the present invention are not necessarily limited thereto.

Embodiments of the present invention advantageously provide a platform to interact with multiple users by analyzing and combining respective learning models of multiple users, and based on the analysis and/or combination identify interactions/activities for the multiple users to be performed during a collaborative automated learning session.

Thus, illustrative embodiments address the issue of enabling social learning through device sharing, and using AI to analyze previous user interaction data (including metadata) for optimizing group learning activities. The illustrative embodiments provide seamless continuity across different devices used for automated learning and their users, and enable users in proximity to each other to utilize social learning to enhance their AI learning models and improve overall learning based on interactions with each other. AI includes use of machine learning techniques, such as, but not necessarily limited to, a Support Vector Machine (SVM), a Multilayer Perceptron (MLP), a deep learning model, clustering and a neural network.

FIG. 1A depicts different automated learning session activities, according to an exemplary embodiment of the present invention. Referring to FIG. 1A, an automated learning session activity 110 is a positive/negative type activity (e.g., Yes/No, True/False activity), which is shown on a smart watch. The activity 110 provides a question or statement to which a positive or negative response must be furnished by the user. For example, the activity 110 asks whether the statement that "senses do not decrease in function until older adulthood" is correct. FIG. 1A further depicts a concept grouping activity 120 on a smart watch, in which a user is given a plurality of concepts and asked to group the concepts in their respective categories. For example, the activity provides a plurality of concepts and asks a user to group them as "senses" or "physical changes."

Figure 1B:
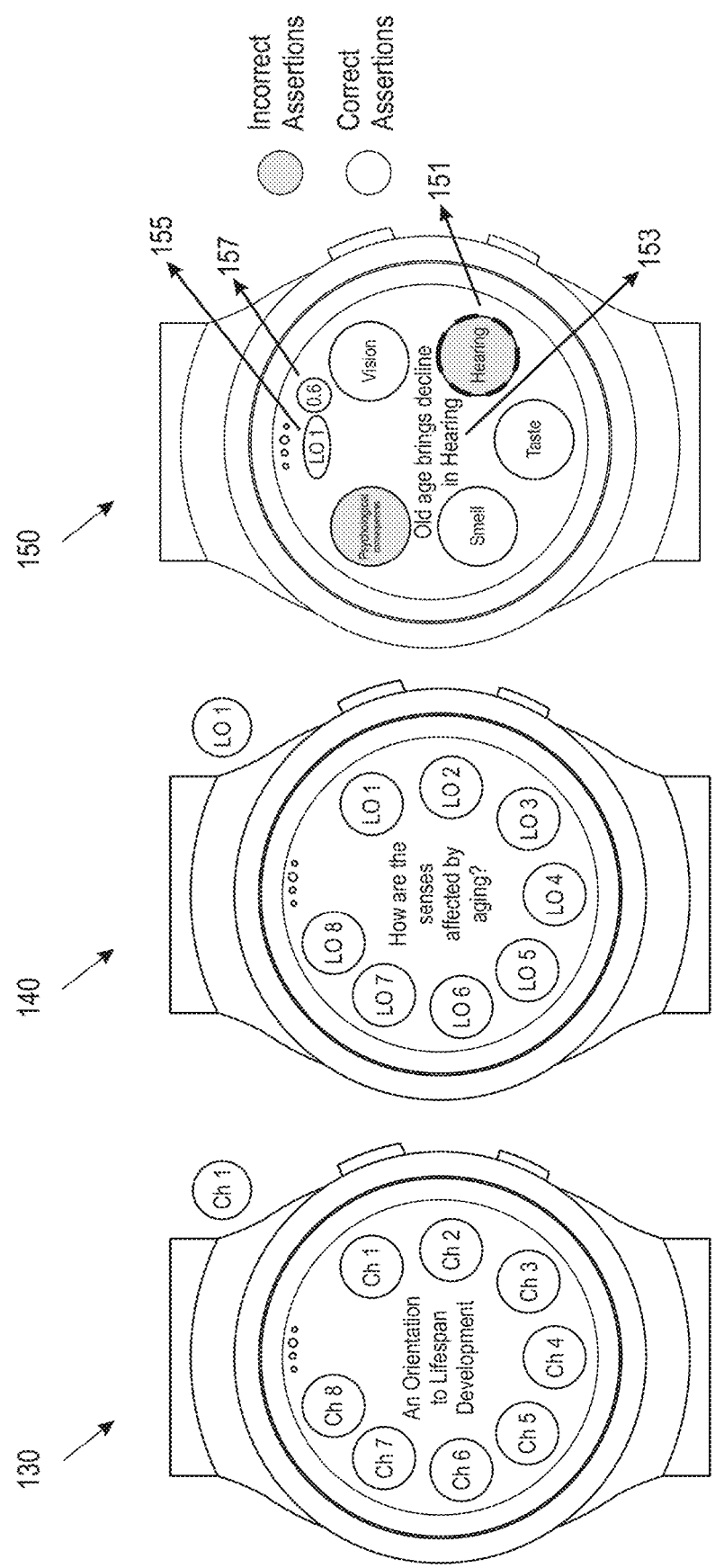
FIG. 1B depicts different automated learning session selections, according to an exemplary embodiment of the present invention.

FIG. 1B depicts different automated learning session selections, according to an exemplary embodiment of the present invention. For example, referring to FIG. 1B, a chapter selection 130 is shown on a smart watch, in which a user selects a chapter for a given subject (e.g., "Orientation to Lifespan Development") to be pursued during an automated learning session. In this case, chapter 1 (Ch 1) has been selected. Also shown in FIG. 1B is a learning objective selection 140 on a smart watch, in which a user selects a learning objective for a given subject (e.g., effects of aging on senses) to be pursued during an automated learning session. In this case, learning objective 1 (LO 1) has been selected. FIG. 1B further illustrates an assertion selection 150 on a smart watch, in which a user selects an assertion 151 to complete a sentence, as indicated by the assertion text 153 (e.g., "Old age brings a decline in hearing"), and is informed, for example, by pattern or color coding which assertions are correct or incorrect. As shown in FIG. 1B, additional information may be displayed on the user interface of the device, including for example, the selected learning objective 155 (and/or chapter) and/or user performance details 157, for example, based on a numerical or alphabetical scale. Evaluation of user performance may take a variety of factors into account, such as, but not necessarily limited to, obvious mistakes, activity/question difficulty, and/or performance of others on the same question/activity.

Figure 2:
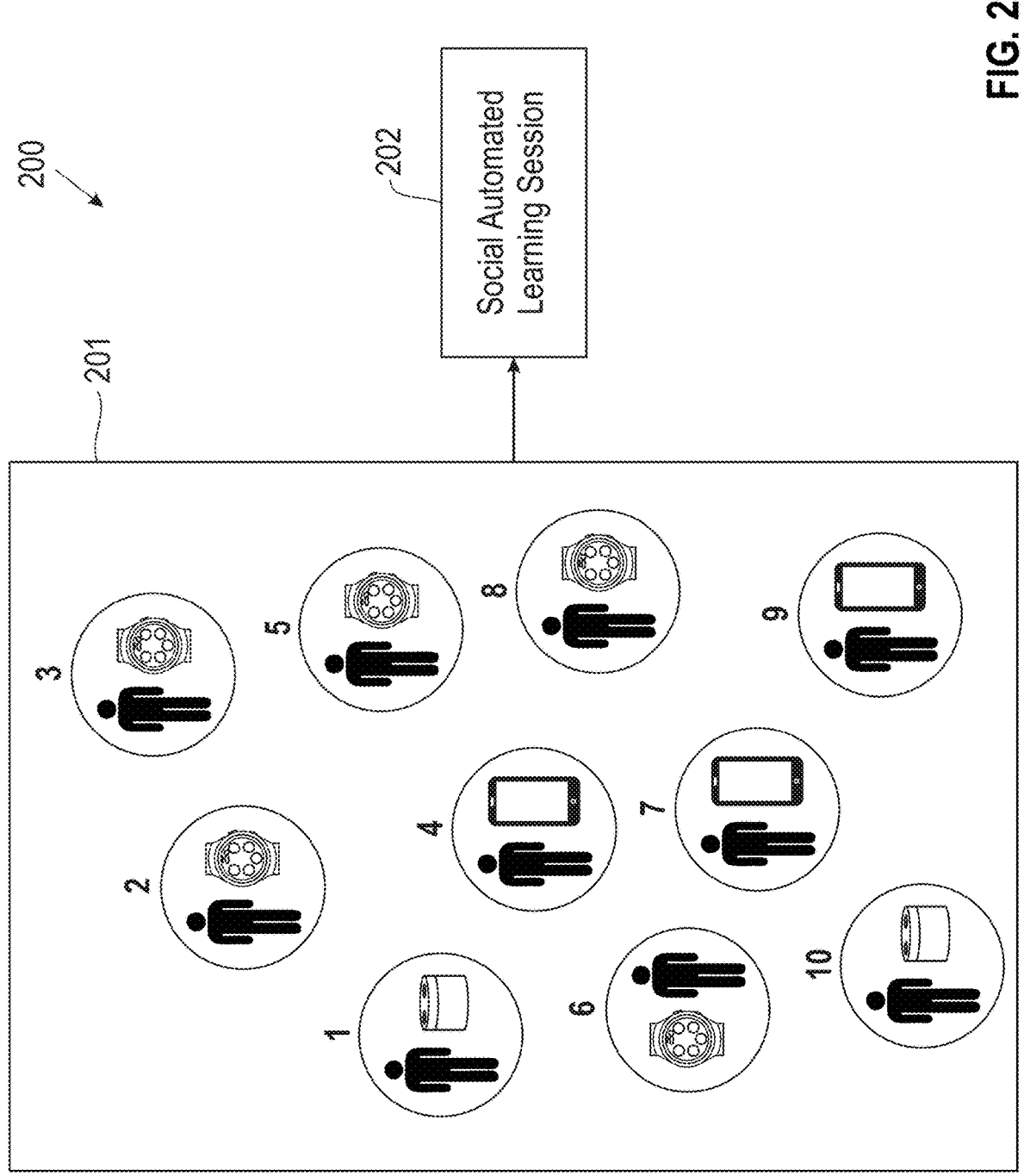
FIG. 2 depicts a system context diagram illustrating users with different devices, according to an exemplary embodiment of the present invention.

FIG. 2 depicts a system context diagram 200 illustrating users with different devices, according to an exemplary embodiment of the present invention. Referring to FIG. 2, in block 201, a plurality of users and their corresponding devices are shown. The users are numbered 1-10 and correspond to respective devices, such as, for example, mobile telephones (users 4, 7 and 9), smart watches (users 2, 3, 5, 6 and 8), and voice activated audio devices (users 1 and 10). The devices have different capabilities. As shown in FIG. 2, the users 1-10 and their respective devices are linked for a social automated learning session 202. In accordance with an embodiment, a proximity based authentication can be performed to authenticate the users 1-10 for the automated learning session. Proximity based authentication can be performed using proximity sensors to identify user devices in the same proximity as each other. For example, sensors can measure proximity between the user devices in a dynamic range-based mesh network. The sensors can be worn on the users, be integrated in the user devices, and/or attached to selected portions of a room in which the users are present. Automated learning session activities for the users 1-10 can be determined based on, for example, the types of the user devices and data associated with the users' learning models.

Figure 3:
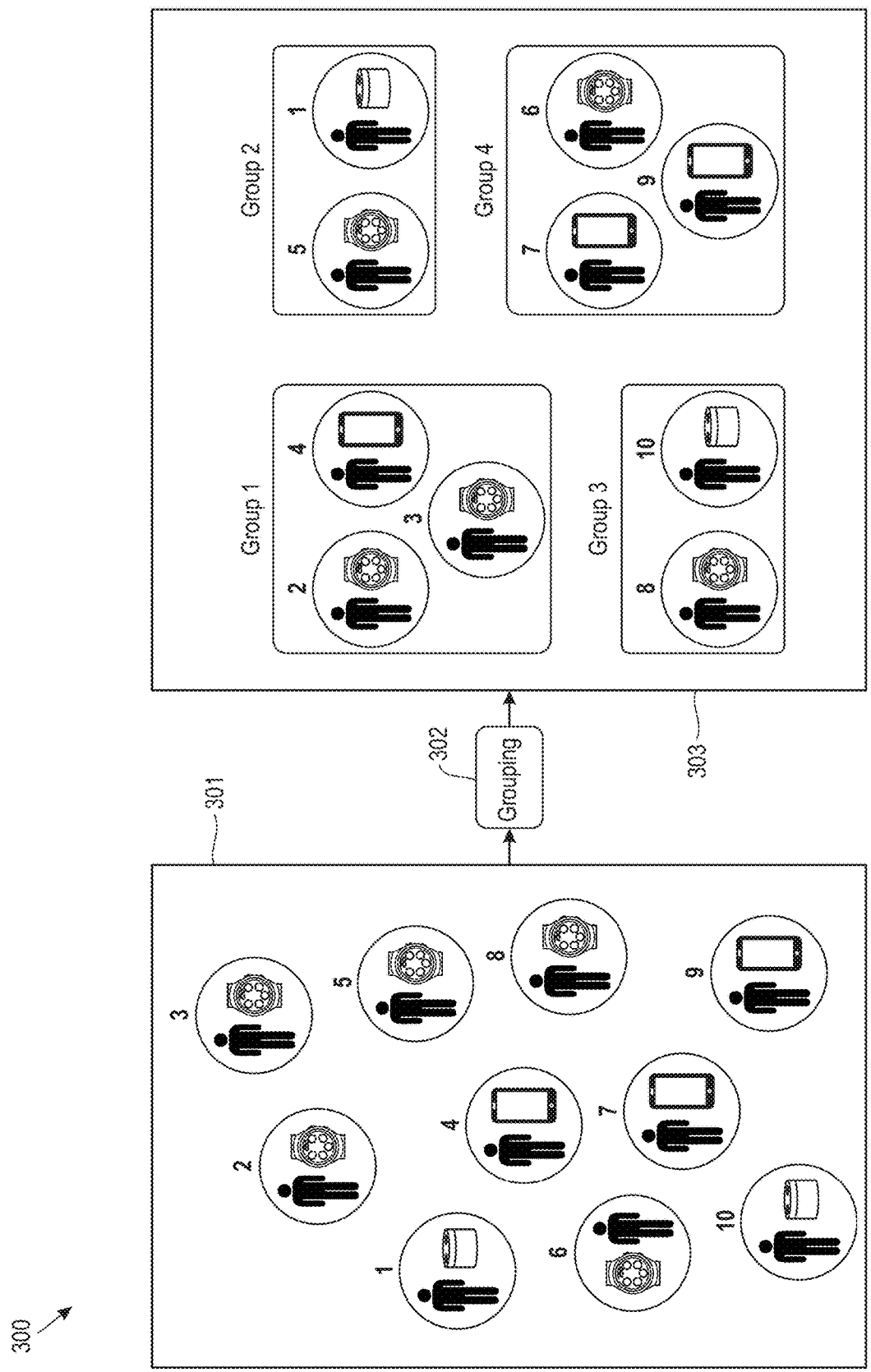
FIG. 3 depicts a diagram illustrating multiple user grouping for a social automated learning session, according to an exemplary embodiment of the present invention.

FIG. 3 depicts a diagram 300 illustrating multiple user groupings for a social automated learning session, according to an exemplary embodiment of the present invention. Referring to FIG. 3, similar to FIG. 2, in block 301 a plurality of users and their corresponding devices are shown. The users are numbered 1-10 and correspond to respective devices, such as, for example, mobile telephones (users 4, 7 and 9), smart watches (users 2, 3, 5, 6 and 8), and voice activated audio devices (users 1 and 10). As shown in FIG. 3, the users 1-10 and their respective devices are automatically grouped (block 302) into a plurality of groups (Groups 1, 2, 3 and 4) (block 303). In accordance with one or more embodiments of the present invention, automatic grouping is performed based on device type, common links between user learner models, proximity constraints, and/or the context in which the users are interacting (e.g., whether the users are moving, in which case the users may need hands free (e.g., audio) type activities, or the users are stationary and do not require hands free type activities). Groups can also be formed based on, for example, mentor and mentee roles, common learning or educational objectives, common activities, questions or subjects determined to be difficult, and users determined to be sharing the same device(s) to perform group activities.

Figure 4:
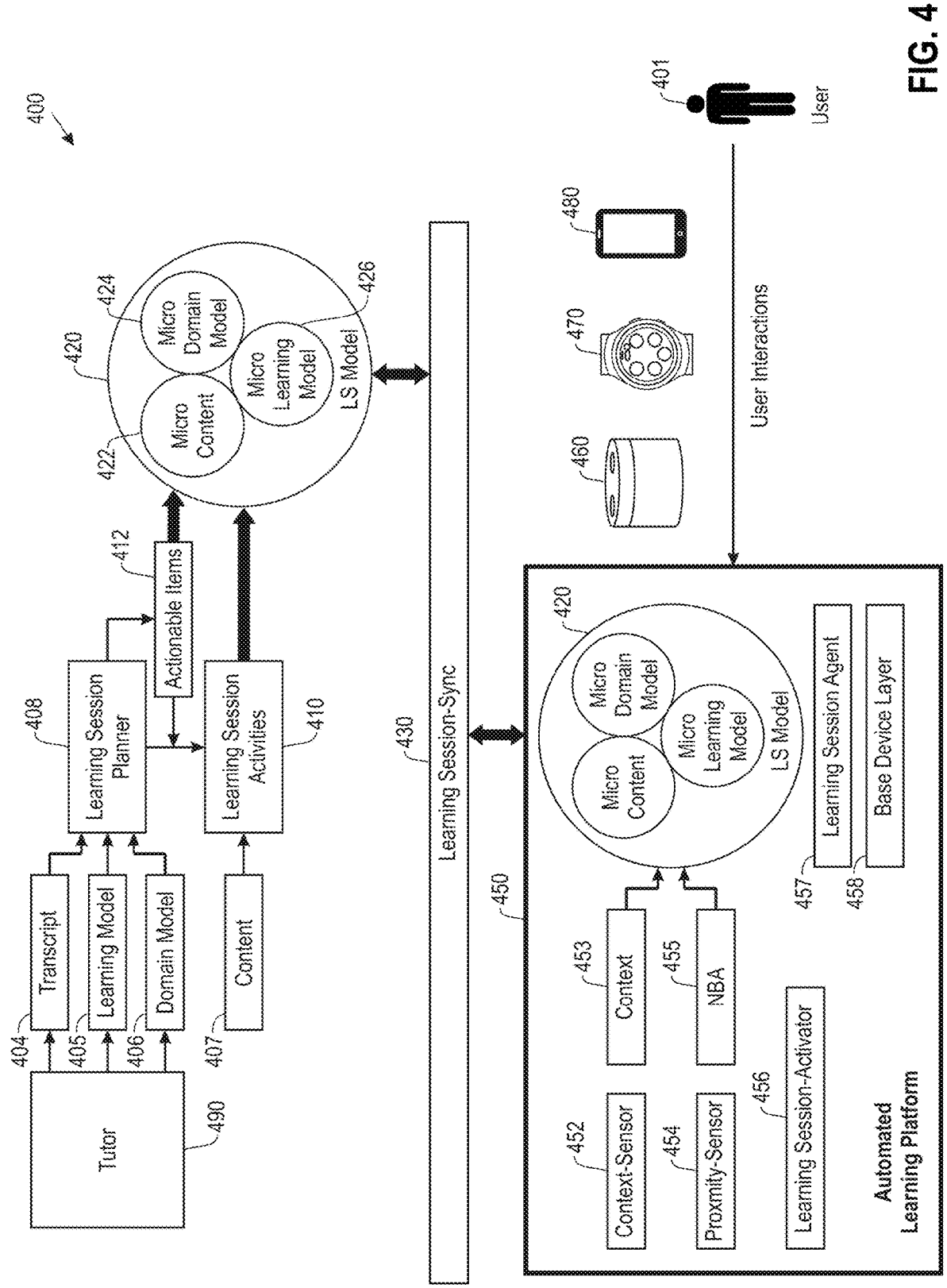
FIG. 4 depicts a block diagram of an automated learning architecture including an automated learning platform, according to an exemplary embodiment of the present invention.
Figure 5:
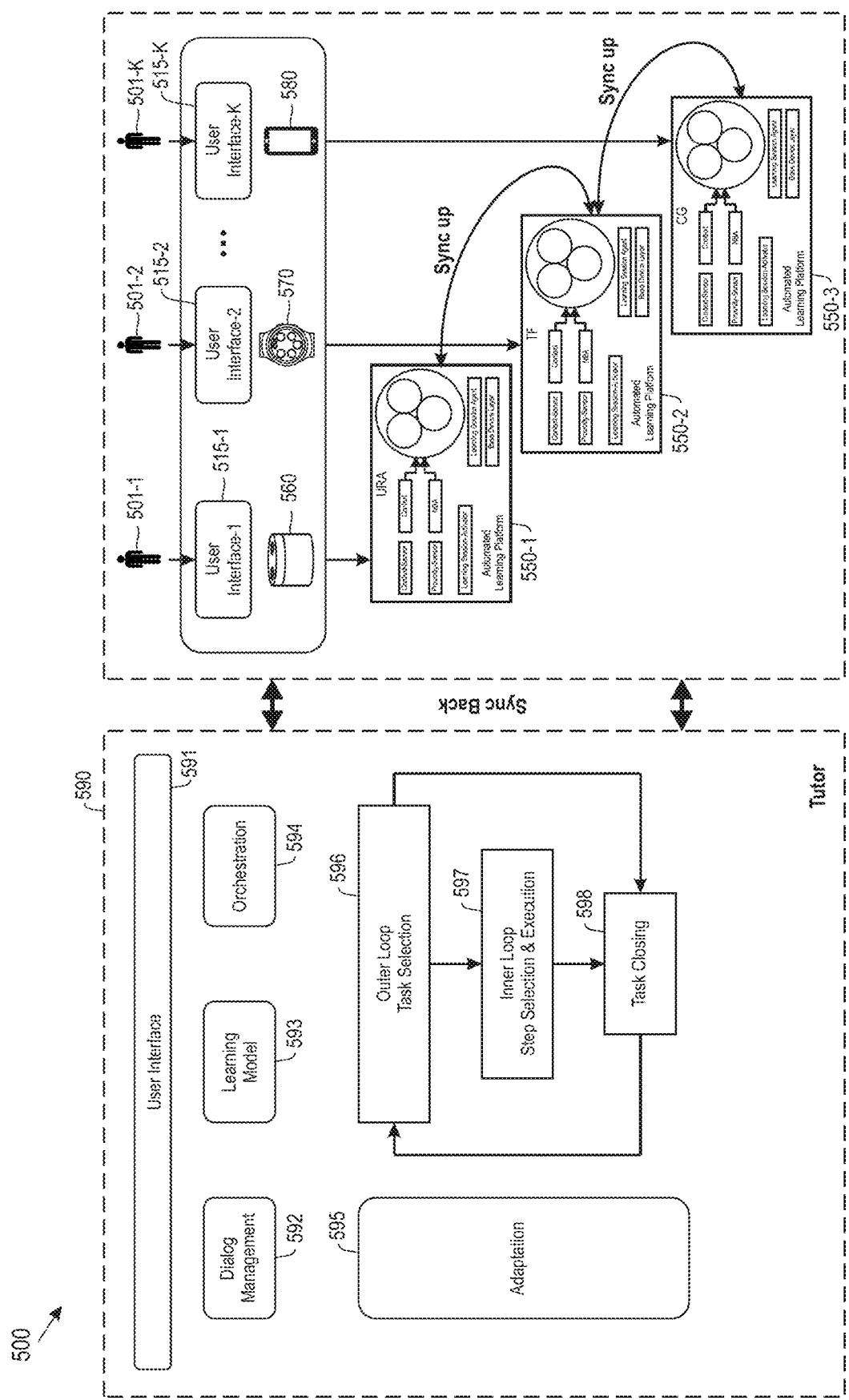
FIG. 5 depicts a block diagram of an architecture for syncing of multiple devices to execute an automated learning session for enabling social learning, according to an exemplary embodiment of the present invention.
Figure 6:
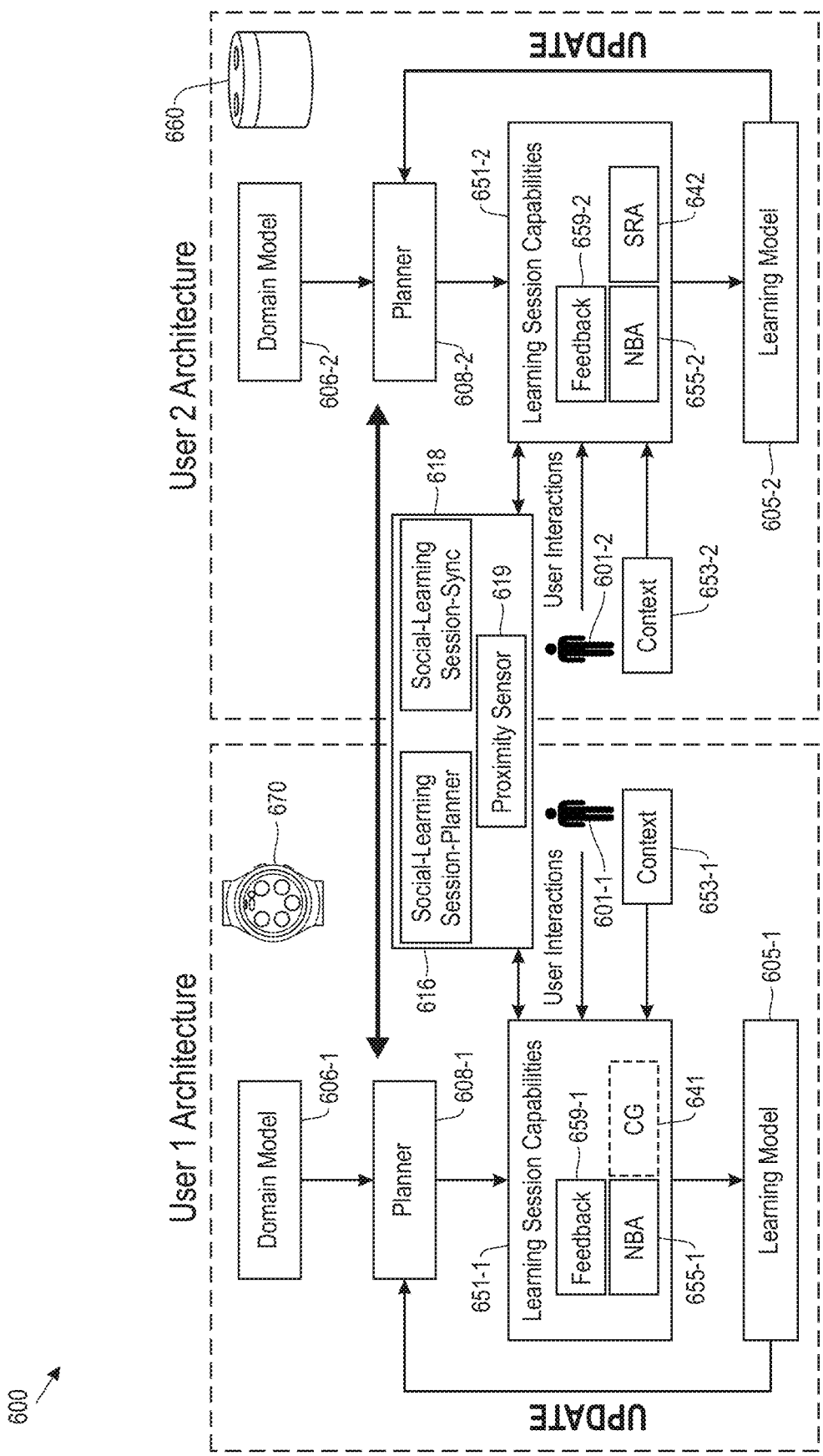
FIG. 6 depicts a block diagram of an architecture for sharing automated learning system capabilities between two devices for enabling social learning, according to an exemplary embodiment of the present invention.

FIGS. 4, 5 and 6 depict block diagrams of various architectures in connection with the execution of automated learning sessions, according to exemplary embodiments of the present invention. As shown in FIGS. 4-6 by lines and/or arrows, the components of the systems 400, 500 and 600 are operatively coupled to each other via, for example, physical connections, such as wired and/or direct electrical contact connections, and/or wireless connections, such as, for example, Wi-Fi™, BLUETOOTH®, IEEE 802.11, and/or networks, including but not limited to, a local area network (LAN), wide area network (WAN), cellular network, ad hoc networks, WANET, satellite network or the Internet. For example, a network can operatively link one or more components of the systems 400, 500 and 600.

By way of non-limiting example, in accordance with an embodiment of the present invention, FIG. 4 depicts a block diagram of an automated learning architecture including an automated learning platform. Referring to FIG. 4, the system 400 includes a tutor component 490, which controls user interaction and interfacing on a device executing an automated learning session. A transcript component 404 maintains a record (e.g., transcript) of user interactions, including, for example, responses, selections, assertions, etc. made during one or more automated learning sessions.

The learning model 405 includes information related to a user, such as, for example, how well the user has performed (e.g., scored) in each of the learning/enabling objectives of one or more automated learning sessions, selected objectives, potentially problematic subjects/areas, activity preferences, and/or device preferences. The domain model 406 includes, for example, domain related information, such as areas of study, requirements, and/or progress in satisfying requirements for a user. The domain model 406 also includes questions, answers, and hints, and information regarding dependency of subject matter on previous learning objectives, difficulty of a learning objective, how much of a learning objective a user has already covered.

Based on a user's transcripts, learning model 405 and domain model 406, the learning session planning component 408 identifies the list of actionable or problem items 412 for the user to revise, strengthen, improve upon, and/or address. For example, the learning session planning component 408 will make determinations about what a user needs to remedy, based on how much time the user took to answer or respond to questions or activities, whether a user's actions indicated confusion/indecision (e.g., selecting and unselecting an answer, not responding to an inquiry, changing a correct answer to an incorrect answer) and/or a number of hints that were given to a user to complete a learning objective.

Based on the identified actionable items 412, as well as the user's transcripts, learning model 405 and domain model 406, the learning session planning component 408 determines appropriate learning session activities 410 that a user should perform during an automated learning session. In non-limiting examples, such activities may include: (i) a fill-in-the-blank (FITB) activity, where a user is required to choose or provide a missing concept/word/phrase for a given statement; (ii) positive/negative activity, where, for example, if a user has expressed some misconception, then this activity will be triggered for certain questions where student has to select a positive or negative response (e.g., yes or no, true or false) to answer a question; (iii) concept grouping activity, where, for example, a lower performing user may be given this activity to place different concepts in specified groups; and (iv) a user response analysis activity, which can be triggered when a user requests an assessment and device that the user is using is capable of user response analysis.

Learning session activities 410 are also based on content 407. Content 407 includes, for example, electronic resources, such as, but not necessarily limited to, textbooks, articles, websites, syllabuses, encyclopedias, etc. including, for example, factual content, learning objectives and enabling objectives. Content 407 further includes content packages, which include a list of modules/packages which will be required during the automated learning sessions. Content packages may be different for different devices. For example, a smart watch may not require the same response analysis capabilities that a voice activated audio device may need to respond to user prompts.

The learning session planning component 408 determines a dynamic and personalized set of learning activities 410 for a user. The learning session planning component 408 identifies the domain of learning activities 410 based on the learning model 405, transcripts of previous automated learning sessions and learner preferences. The learning session planning component 408 identifies the topics, subtopics, etc. to be part of the learning activities 410. The learning session planning component 408 identifies the suitable activities 410 based on the domain model 406 and also based on the devices that are available to the user.

Based on the actionable items 412 and the learning session activities 410, a learning session model 420 comprising micro-content 422, a micro-domain model 424, a micro learning model 426 and micro-activation rules (not shown) is developed. Using a learning session-sync component 430, the learning session model 420 is synchronized with one or more user devices, such as, for example, a voice activated audio device 460, a smart watch 470 and/or a mobile telephone 480. In more detail, the learning session model 420 is incorporated into an automated learning platform 450 that is executed for any number of users 401 and their corresponding user devices 460, 470 and/or 480.

The learning session-synch component 430 is a communication layer between the one or more user devices (e.g., user devices 460, 470 and/or 480) and the tutor component 490. In accordance with an embodiment of the present invention, the learning session-sync component 430 pushes the learning session model 420 to one or more user devices, updates the tutor component 490 based on the user interactions during the automated learning session (e.g., updates the learning model 405 using the micro-learning model 426, and enables communication between multiple user devices). The learning session-sync component 430 also detects: (i) when to synch; (ii) the end of a quantum of activity; and (iii) other user devices.

The micro-domain-model 424 is determined based on the identified concepts for the activities 410, their pre-requisites, required depth of pre-requisites, etc. The micro-domain model 424 keeps track of the interactions of a user during an automated learning session. An initial state of the micro learner model 426 is same as the learner model 405. The micro learner model 426 will be updated based on the tracked user interactions from the micro domain model 424. The updated micro learner model 426 is provided to the planning component 408 for determining subsequent activities. The micro-content 422 is determined based on the domain model 406, planned activities, pre-requisites and constraints on user devices.

The automated learning platform 450 includes a context sensor 452, which senses context 453 (e.g., status) of a user device. For example, context can include user movement (e.g., walking), vehicle movement (e.g., user is driving), stationary, or idle (e.g., not performing other activities). Certain activities will be triggered based on the context 453, while other activities will be avoided based on the context 453. For example, moving users may require hands free (e.g., audio) type activities, while stationary users may not require hands free type activities.

The automated learning platform 450 includes a next best action (NBA) component 455. Based on a user's previous interactions made during the automated learning session, the NBA component 455 identifies subsequent activities to be performed during the same automated learning session at run time. For example, if a user is performing well for a particular learning objective during an automated learning session, then the NBA component 455 may increase the difficulty of presented activities or move to higher level material so that a user can be presented with personalized activities based on their progress.

The automated learning platform 450 includes a proximity sensor 454 to identify nearby user' devices, and enable social learning. The proximity sensor 454 provides notifications to other automated learning platforms to share their capabilities with nearby devices. The automated learning platform 450 also includes a learning session activator 456, which detects user context/status using context sensors 452, detects device type and determines user activities during an automated learning session which are suitable for the detected context. For example, when a user is idle, the learning session activator 456 generates FITB activities, and when a user is driving, learning session activator 456 generates a voice based activity (e.g., true/false).

The automated learning platform 450 includes a learning session agent 457, which generates and provides an interface between user and the functionality of the automated learning session. The base device layer 458 captures capabilities of the one or more user devices (e.g., devices 460, 470 and/or 480), and henceforth identifies the content packages which are needed to run the learning session agent 457 on the user's device. The content package includes a list of modules/packages which will be required during the learning sessions, and content packages could be different for different devices. For example, a smart watch 470 may not need response analysis capabilities, whereas a voice activated audio device 460 requires audio capabilities to process or respond to user input.

FIG. 5 depicts a block diagram of an architecture 500 for syncing of multiple devices to execute an automated learning session for enabling social learning, according to an exemplary embodiment of the present invention. Referring to FIG. 5, the tutor component 590, which is the same or similar to tutor component 490 in FIG. 4, includes a user interface 591, a dialogue management module 592, a learning model 593, an orchestration layer 594, and an adaptation module 595. The tutor component 590 further includes outer loop task selection, inner loop step selection and execution and task closing modules 596, 597 and 598.

The dialogue management module 592 controls delivery of the activities and/or conversations with a user. The progression of the activities and/or conversations depends on user interactions and/or responses in connection with, for example, hint questions, feedback requests, and/or dynamically generated fill-in-the-blank prompts. The dialogue during a learning session may begin with, for example, posing a question to a user or requesting a response to a concept grouping activity. When the user responds, the system analyzes the user interactions and provides the appropriate feedback.

The learning model 593 estimates the user's degree of mastery for each of the domain topics based on the user's performance on assessments. The learning model 593 estimates and updates the user's skill level and question difficulty based on the user's interactions with the system.

The orchestration layer 594 communicates with a set of modules, such as, but not necessarily limited to, the outer loop task selection module 596 (Next Best Action), learning model 593, dialogue management module 592, and user response analysis module to provide a seamless experience for a user.

The outer loop task selection module 596 identifies the next possible task and/or activity for a user by analyzing the history of the user's interactions with the system, user's knowledge information (e.g., mastery), and user context information (e.g., moving, idle, running, etc.).

The inner loop step selection and execution module 597 is configured to assist the user with learning while interacting with the system. More specifically, the inner loop step selection and execution module 597 provides minimal feedback to a user based on user interactions (whether correct or incorrect) during a learning session. The inner loop step selection and execution module 597 also assists with the generation of hints for subsequent steps, and performs an assessment of the user's interaction.

The task closing module 598 is configured to provide a seamless interaction for a user when the user finishes a task/step and is moving on to a subsequent task/step. The adaptation module 595 captures the user interactions and adapts the dialogue flow by selecting the appropriate tasks/steps for a user based on the captured user interactions.

FIG. 5 further illustrates synching of multiple automated learning platforms 550-1, 550-2 and 550-3 for a social automated learning session. A plurality of users 501-1, 501-2, . . . 501-K through user interfaces 515-1, 515-2, . . . 515-K interface with user devices 560, 570 and 580 corresponding to automated learning platforms 550-1, 550-2 and 550-3. Like the devices 460, 470 and 480, the devices 560, 570 and 580 correspond to a voice activated audio device, a smart watch and a mobile telephone. Based on, for example, the device capabilities, context, and/or learning objections, the platforms 550-1, 550-2 and 550-3 are respectively running user response analysis (URA), true/false (TF) and concept grouping (CG) activities.

Referring further to FIG. 5, sync back illustrates the process of synchronizing a learning session model with user devices based on device capabilities, infrastructure, learner context and learner preferences. The learning sessions can be also experienced in an offline manner (if needed), and interactions and outcomes are synched with an online tutor component (e.g., tutor component 590) when possible. Learning sessions can be experienced using one or more user devices, such as, for example, a voice activated audio device 560, a smart watch 570, and/or a mobile telephone 580 so that user can experience learning sessions even when user is not connected to the tutor component 590.

FIG. 6 depicts a block diagram of an architecture 600 for sharing automated learning system capabilities between two devices for enabling social learning, according to an exemplary embodiment of the present invention. Referring to FIG. 6, nearby devices 660 and 670 executing automated learning sessions can share information gleaned from the learning sessions for each of the users 601-1 and 601-2, and can share learning session capabilities 651-1 and 651-2. The nearby devices can be identified using one or more proximity sensors 619 as described herein. Activities, such as, for example, concept grouping (CG) 641 and user response analysis (URA) 642 may be based on device type.

In this case, similar to the learning session planning component 408 discussed in connection with FIG. 4, based on the domain and learning models 606-1/606-2 and 605-1/605-2, the learning session planning components 608-1/608-2 can suggest the activities that can be performed by multiple users 601-1 and 601-2 by combining their devices 660 and 670, as well as the knowledge from the multiple users, which enables the social learning. As shown by the update arrows, the learning session planning components 608-1/608-2 can be dynamically updated as the learning models 605-1/605-2 are modified.

In more detail, using AI, the social-learning session-planner 616 determines the objectives of interest based on, for example, transcripts, domain models 608-1/608-2 and learning models 605-1/605-2 from multiple users 601-1 and 601-2. The objectives of interest include, for example, prerequisites, similar objectives, and objectives with similar difficulty, which are shared by the multiple users. A view of the domain models 608-1/608-2 focused around the objectives of interest, and a micro-domain model for multiple users are generated.

Activities for the social learning session are based on, for example, user device preferences, activity preferences, type of content, and group compatibility. A set of activities for the selected set of objectives for a group of students is generated for the social automated learning session. The social-learning session-sync component 618 updates the learning session models (e.g., learning session model 420) based on device type of the users' devices 660 and 670 to perform social activities. The social-learning session-sync component 618 can be initiated from one of the user devices which has sufficient power/battery life/resources, when compared with the other one of the user devices.

FIG. 6 includes context and NBA components 653-1/653-2 and 655-1/655-2 similar to those described in connection with FIG. 4. The feedback components 659-1/659-2 include feedback messages associated with the user interactions. The feedback components 659-1/659-2 identify the interactions and provide appropriate feedback messages to the user. For example, based on an assessment score using assessment models, feedback about user performance can be provided to the user. Similarly, hints and/or motivating messages can be provided as feedback to the user during a learning session.

Figure 7:
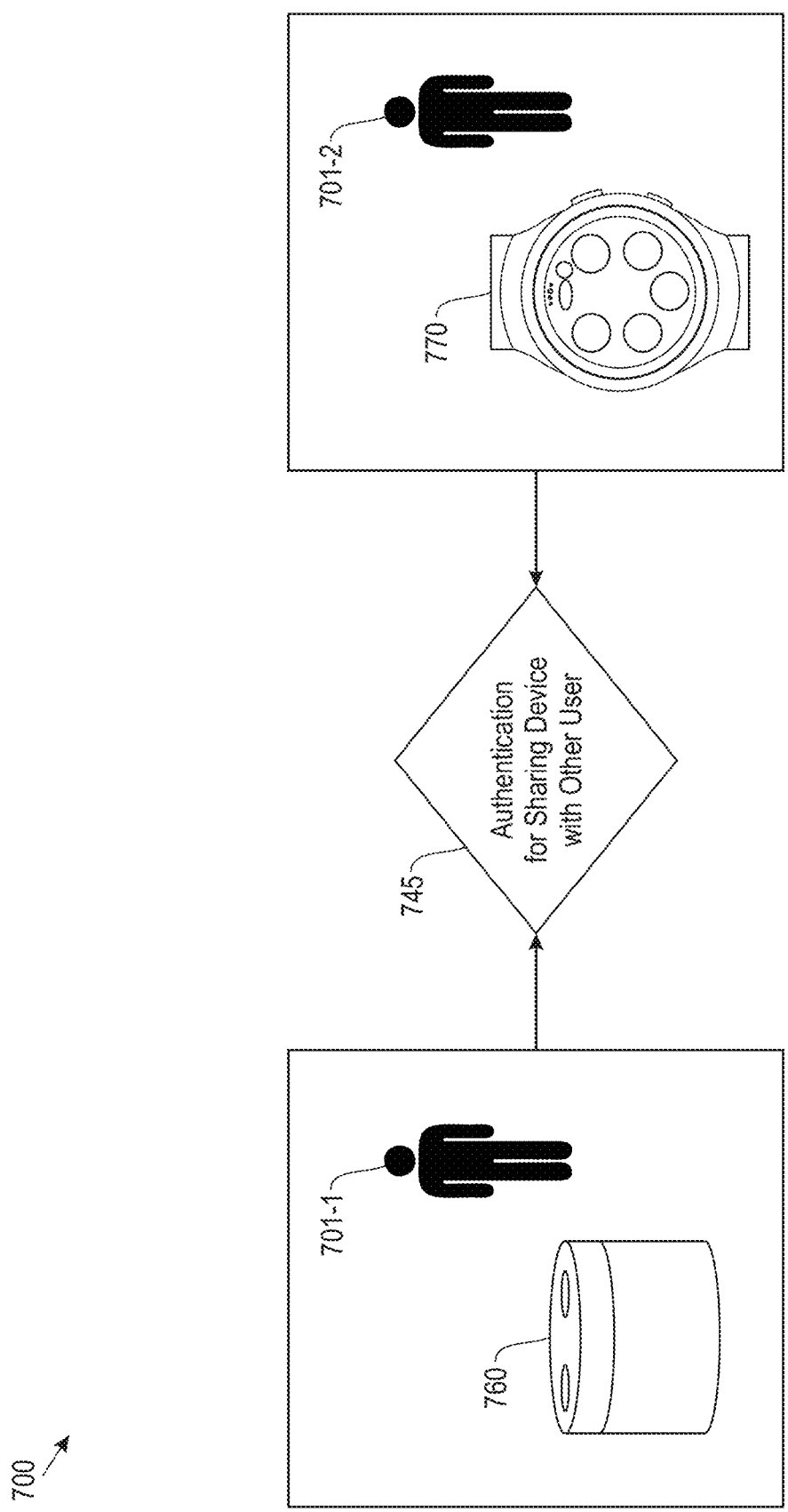
FIG. 7 depicts a block diagram of authentication to connect multiple devices for enabling social learning, according to an exemplary embodiment of the present invention.

FIG. 7 depicts a block diagram of authentication to connect multiple devices for enabling social learning, according to an exemplary embodiment of the present invention. In the authentication scenario 700, users 701-1 and 701-2 along with their corresponding devices 760 and 770 are nearby (e.g., detected using proximity sensor). The users 701-1 and 701-2 want to share their devices 760 and 770 for enabling social learning. Devices 760 and 770 can be connected via WiFi™/Bluetooth® or any other connection protocol. Devices can share learning session capabilities only after authenticating the users 701-1 and 701-2. In order to authenticate the user 701-1 with user 701-2 (block 745), user 701-1 performs a set of learning session interactions which will pass from the device 760 of user 701-1 to the device 701-2 of user 701-2. Users can search for pairing the nearby device and perform the pairing by performing authentication.

Figure 8:
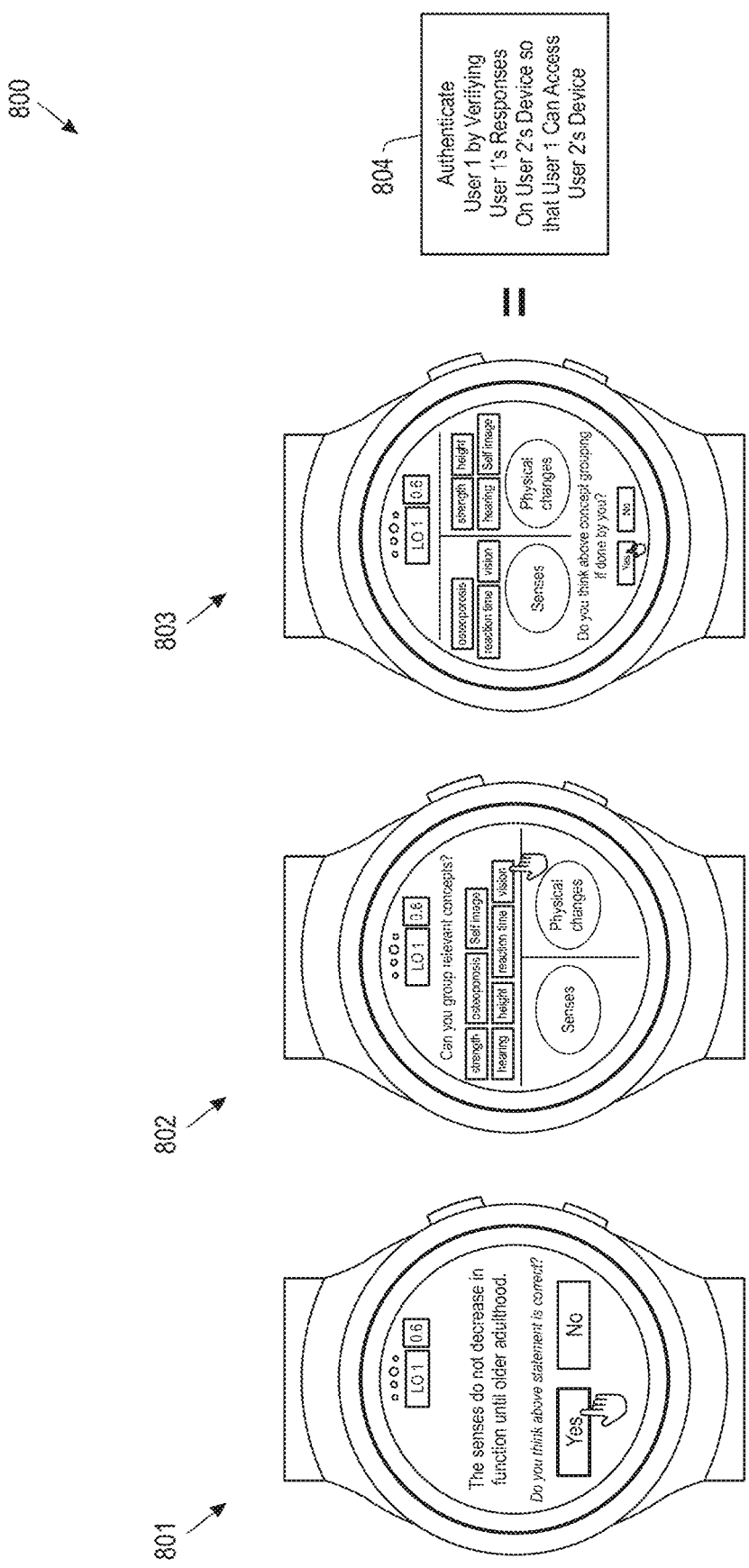
FIG. 8 depicts steps for authenticating a first user by verifying the first user's responses on a second user's device in order to enable social learning, according to an exemplary embodiment of the present invention.

FIG. 8 depicts steps for authenticating a first user by verifying the first user's responses on a second user's device in order to enable social learning, according to an exemplary embodiment of the present invention. Referring to FIG. 8, in the authentication scenario 800, a first user (User-1) is authenticated by verifying the first user's responses on a device of second user (User-2). For example, steps 801, 802 and 803 are verifications of User-1's responses performed by User-2 on User-2's smart watch. In step 801, User-2 verifies User-1's responses by selecting YES/NO. In step 802, User-2 verifies User-1's concept grouping activity. In step 803, User-2 verifies the concept grouping interaction by selecting YES/NO, which results in authentication of User 1 by verifying User 1's responses on User 2's device so that User 1 can access User 2's device (block 804). In other words, User-1's responses/activities are used to authenticate User-1 with User-2. After authenticating the users, devices share the learning session agent so that User-1 and User-2 can perform the learning session interactions together by sharing devices.

Performing a different set of user interactions, such as, for example, concept grouping and the user response analysis on a single user device might not be feasible due to the device type. In this case, sometimes users may have to share their user devices to perform complex activities. For example, combining the voice activated audio device and a smart phone or smart watch, one can perform concept grouping as well as user response analysis activities with the help of multiple user devices. When User-1 and User-2 are authenticated on a set of user devices, then both the users can share their devices to perform user interactions.

Figure 9:
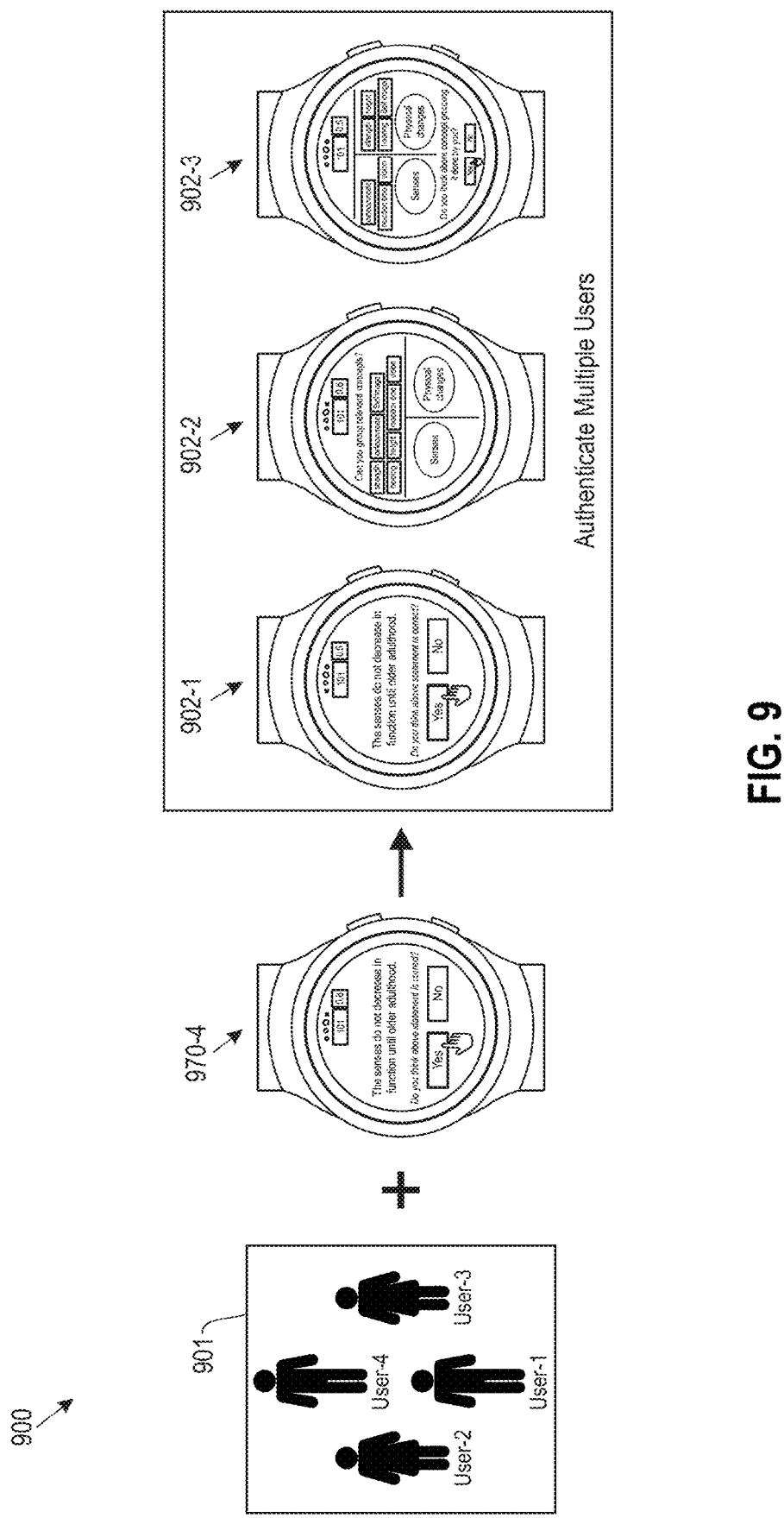
FIG. 9 depicts a diagram illustrating authentication of multiple users on a single device for enabling social learning, according to an exemplary embodiment of the present invention.

FIG. 9 depicts a diagram illustrating authentication of multiple users on a single device for enabling social learning, according to an exemplary embodiment of the present invention. Referring to FIG. 9, in the authentication scenario 900, multiple users 901 (Users-1, 2, 3 and 4) are authenticated on a single device. For example, Users-1, 2 and 3 are authenticated on User-4's device 970-4 (e.g., smart watch). In steps 902-1, 902-2 and 902-3, User-1, User-2 and User-3 respectively perform interactions on device 970-4 to authenticate Users-1, 2 and 3. In an operational example, in a classroom setting, the users/students are wearing proximity sensors so that a set of nearby users can be identified. Once a set of nearby users is identified on one of the user devices, then one device can be used to authenticate multiple users based on user interactions with that device. In accordance with an embodiment of the present invention, a social learning session agent retrieves user specific interactions from a cloud platform and validates the interactions to authenticate the users.

Figure 10:
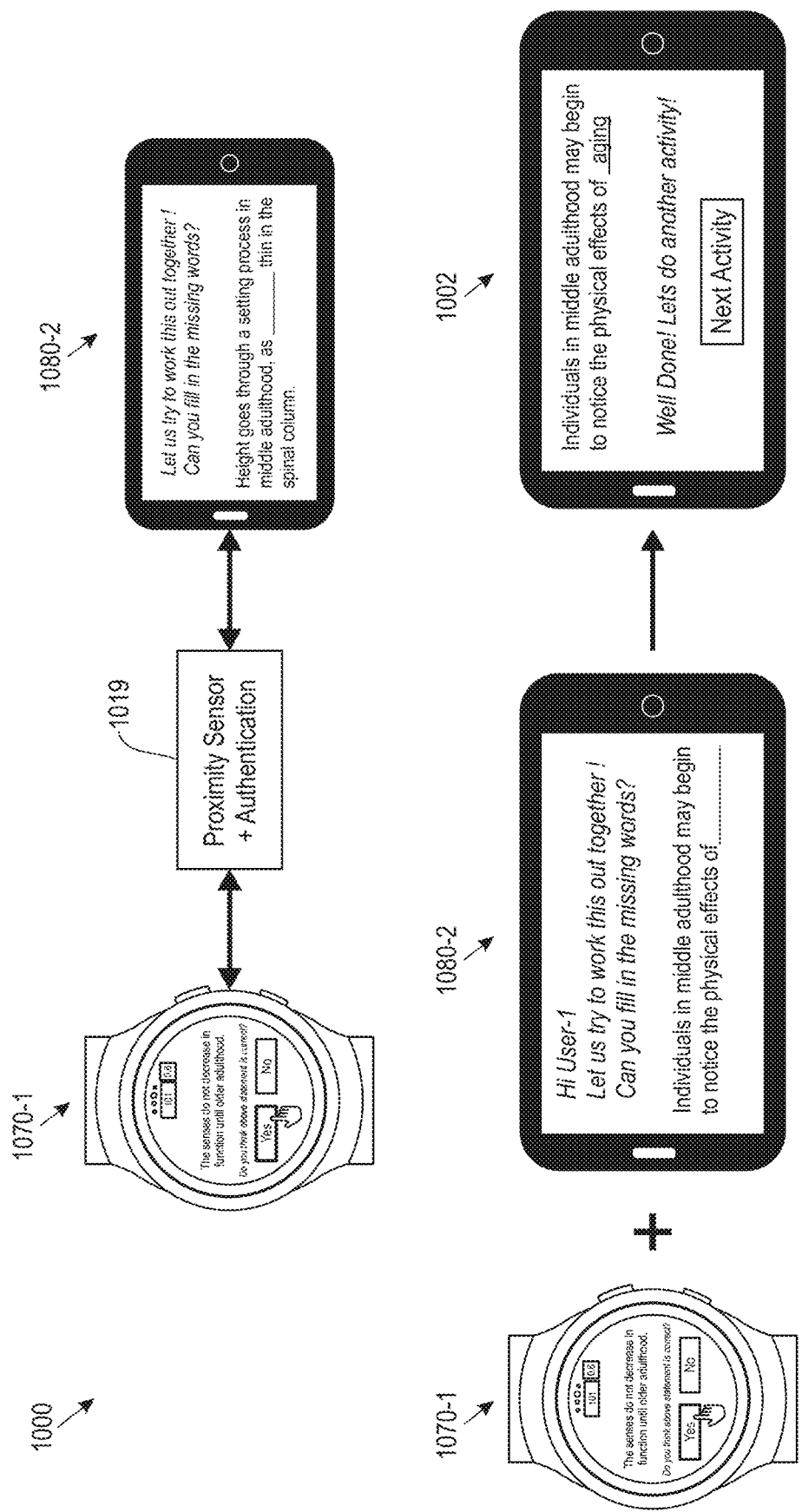
FIG. 10 depicts a diagram illustrating authentication and sharing of a device between two users for enabling social learning, according to an exemplary embodiment of the present invention.

FIG. 10 depicts a diagram illustrating authentication and sharing of a device between two users for enabling social learning, according to an exemplary embodiment of the present invention. Referring to FIG. 10, in scenario 1000, devices 1070-1 corresponding to User-1 and 1080-2 corresponding to User-2 are determined to be nearby using proximity sensor(s) and are authenticated (block 1019). Device 1080-2 is shared by Users-1 and 2 so that User-1 interfaces with the device 1080-2 of User-2 during a shared automated learning session. Referring to block 1002, User-1 can access User-2's device and perform interactions on User-2's device in an automated learning session where learning session capabilities are shared between User-1 and User-2.

Figure 11:
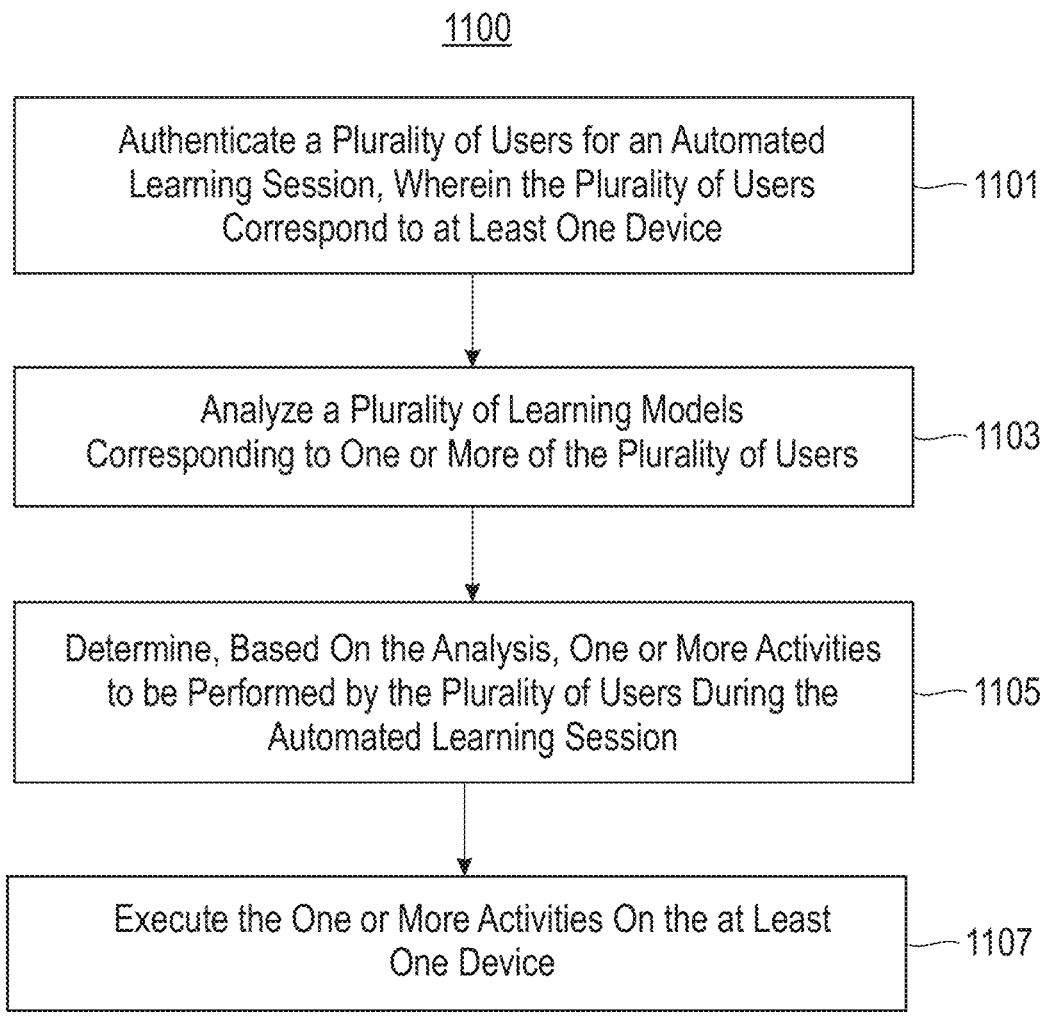
FIG. 11 depicts a process for automated learning, according to an exemplary embodiment of the present invention.

FIG. 11 is a flow diagram of a process for automated learning, according to an exemplary embodiment of the invention. Referring to FIG. 11, the process 1100 includes, at block 1101, authenticating a plurality of users for an automated learning session. The plurality of users respectively correspond to at least one device.

Referring to blocks 1103, 1105 and 1107, the process 1100 further comprises providing the automated learning session for the plurality of users, which includes: (i) analyzing a plurality of learning models corresponding to one or more of the plurality of users; (ii) determining, based on the analysis, one or more activities to be performed by the plurality of users during the automated learning session; and (iii) executing the one or more activities on at least one device. The one or more activities comprise, for example, a fill-in-the-blank activity, a positive/negative activity and/or a concept grouping activity.

The plurality of users can correspond to a given device, wherein the one or more activities are executed on the given device. Alternatively, the plurality of users can correspond to at least a first device, wherein the one or more activities are executed on at least a second device different from the first device.

The analyzing comprises determining one or more common objectives shared by the plurality of users, and a micro-domain model for the plurality of users is generated based on the one or more determined common objectives.

The plurality of users may be grouped into a plurality of subsets based on one or more criteria, such as, for example, device type, determined commonalities between the plurality of learning models, interaction context and/or proximity.

Authenticating the plurality of users for the automated learning session may comprise detecting the proximity of the at least one device with respect to at least one other device, verifying one or more responses to one or more questions of at least one user of the plurality of users on a device used exclusively by another user of the plurality of users, and/or receiving an authentication input from at least two users of the plurality of users on the same device. The same device may correspond to a different user from the at least two users.

Executing the one or more activities may comprise receiving respective responses to a query from at least two users of the plurality of users via the same device during the automated learning session, and/or providing the same query to the plurality of users. Responses of other users to the same query may be displayed on a device of a user.

Providing the automated learning session may also comprise determining, based on one or more responses of the plurality of users to the one or more activities, one or more additional activities to be performed by the plurality of users during the automated learning session, wherein the determining is executed during run time of the automated learning session.

In accordance with an embodiment of the present invention, when multiple users are connected together after performing authentication, they can perform a set of learning session activities. For example, a social learning session which is connected to all authenticated devices can pose the same or different questions and/or hints to the users. If most of the users provide an incorrect answer, the learning session can enable an activity in which users review other students' responses and comment on their answers. In another example, the same activity (e.g., same FITB activity) can be given to multiple users in a group and once their responses are provided, the users can interact with each other while reviewing the answers.

Embodiments of the present invention advantageously provide learning sessions which identify and execute a coherent set of intelligent tutor interactions/activities over a given time period. A learning session planning component determines a dynamic and personalized set of learning activities, identifying a domain of a learning activity based on, for example, learning models, previous learning session transcripts and learner preferences. The learning session planning component identifies topics and subtopics to be part of the learning activity.

As an additional advantage of the embodiments of the present invention, multiple users are able to interact with each other by sharing their devices. Social learning is enabled by combining the learning models of multiple users and determining or suggesting activities that are suited for the users based on the learning models, where users can share their devices and/or inputs on their devices with each other during a learning session.

The present invention may be implemented via a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
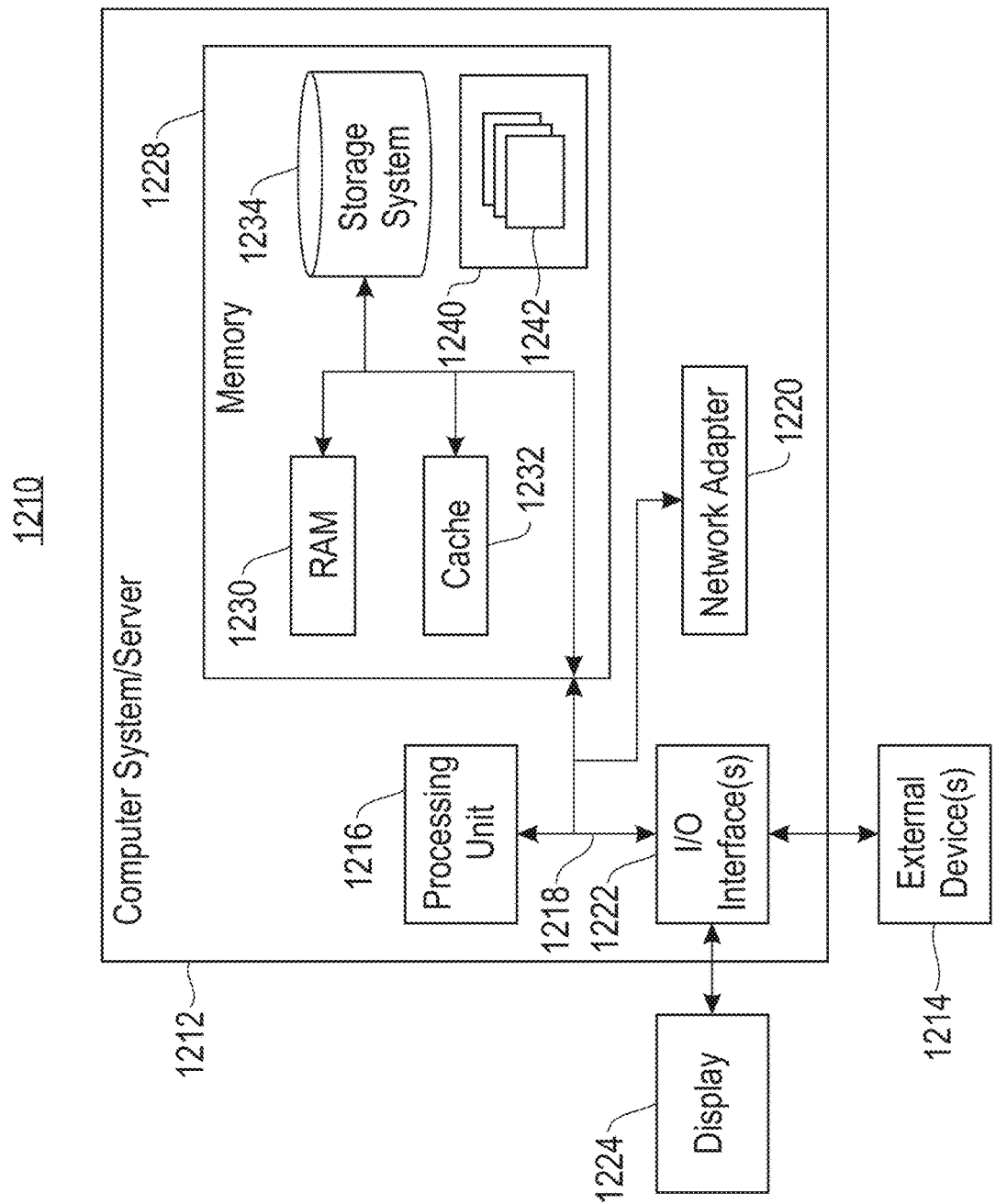
FIG. 12 depicts a computer system in accordance with which one or more components/steps of techniques of the invention may be implemented, according to an exemplary embodiment of the invention.

One or more embodiments can make use of software running on a general-purpose computer or workstation. With reference to FIG. 12, in a computing node 1210 there is a computer system/server 1212, which is operational with numerous other general purpose or special purpose computing system environments or configurations. Examples of well-known computing systems, environments, and/or configurations that may be suitable for use with computer system/server 1212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1212 in computing node 1210 is shown in the form of a general-purpose computing device. The components of computer system/server 1212 may include, but are not limited to, one or more processors or processing units 1216, a system memory 1228, and a bus 1218 that couples various system components including system memory 1228 to processor 1216.

The bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1212 typically includes a variety of computer system readable media. Such media may be any available media that is accessible by computer system/server 1212, and it includes both volatile and non-volatile media, removable and non-removable media.

The system memory 1228 can include computer system readable media in the form of volatile memory, such as RAM 1230 and/or cache memory 1232. The computer system/server 1212 may further include other removable/non-removable, volatile/nonvolatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1218 by one or more data media interfaces. As depicted and described herein, the memory 1228 may include at least one program product having a set (e.g., at least one) of program modules that are configured to carry out the functions of embodiments of the invention. A program/utility 1240, having a set (at least one) of program modules 1242, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments of the invention as described herein.

Computer system/server 1212 may also communicate with one or more external devices 1214 such as a keyboard, a pointing device, a display 1224, etc., one or more devices that enable a user to interact with computer system/server 1212, and/or any devices (e.g., network card, modem, etc.) that enable computer system/server 1212 to communicate with one or more other computing devices. Such communication can occur via I/O interfaces 1222. Still yet, computer system/server 1212 can communicate with one or more networks such as a LAN, a general WAN, and/or a public network (e.g., the Internet) via network adapter 1220. As depicted, network adapter 1220 communicates with the other components of computer system/server 1212 via bus 1218. It should be understood that although not shown, other hardware and/or software components could be used in conjunction with computer system/server 1212. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
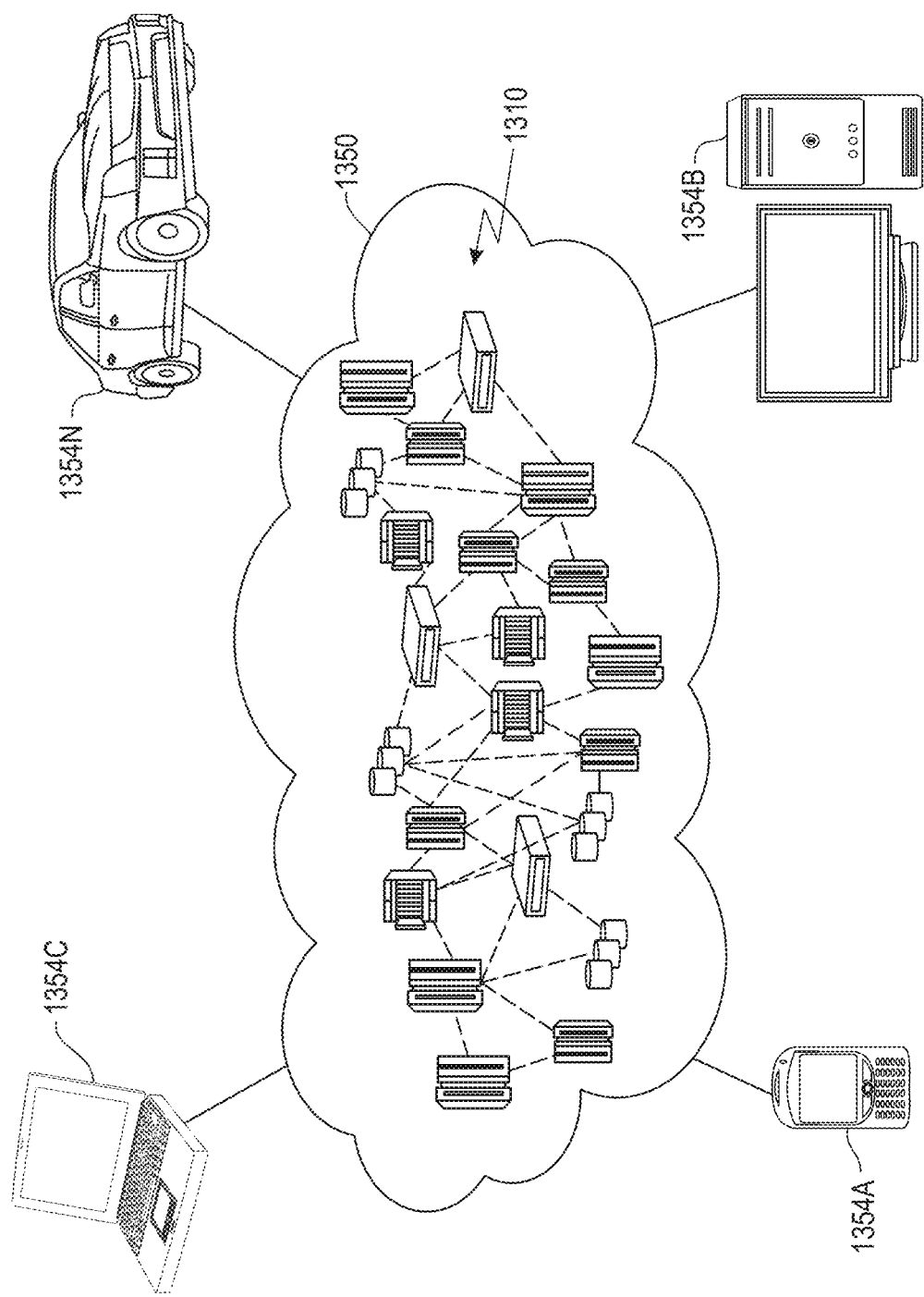
FIG. 13 depicts a cloud computing environment, according to an exemplary embodiment of the present invention.

Referring now to FIG. 13, illustrative cloud computing environment 1350 is depicted. As shown, cloud computing environment 1350 includes one or more cloud computing nodes 1310 with which local computing devices used by cloud consumers, such as, for example, a PDA or a cellular telephone 1354A, a desktop computer 1354B, a laptop computer 1354C, and/or an automobile computer system 1354N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1310 and cloud computing environment 1350 can communicate with any type of computerized device over any type of network and/or network addressable connection (e.g., using a web browser).

Figure 14:
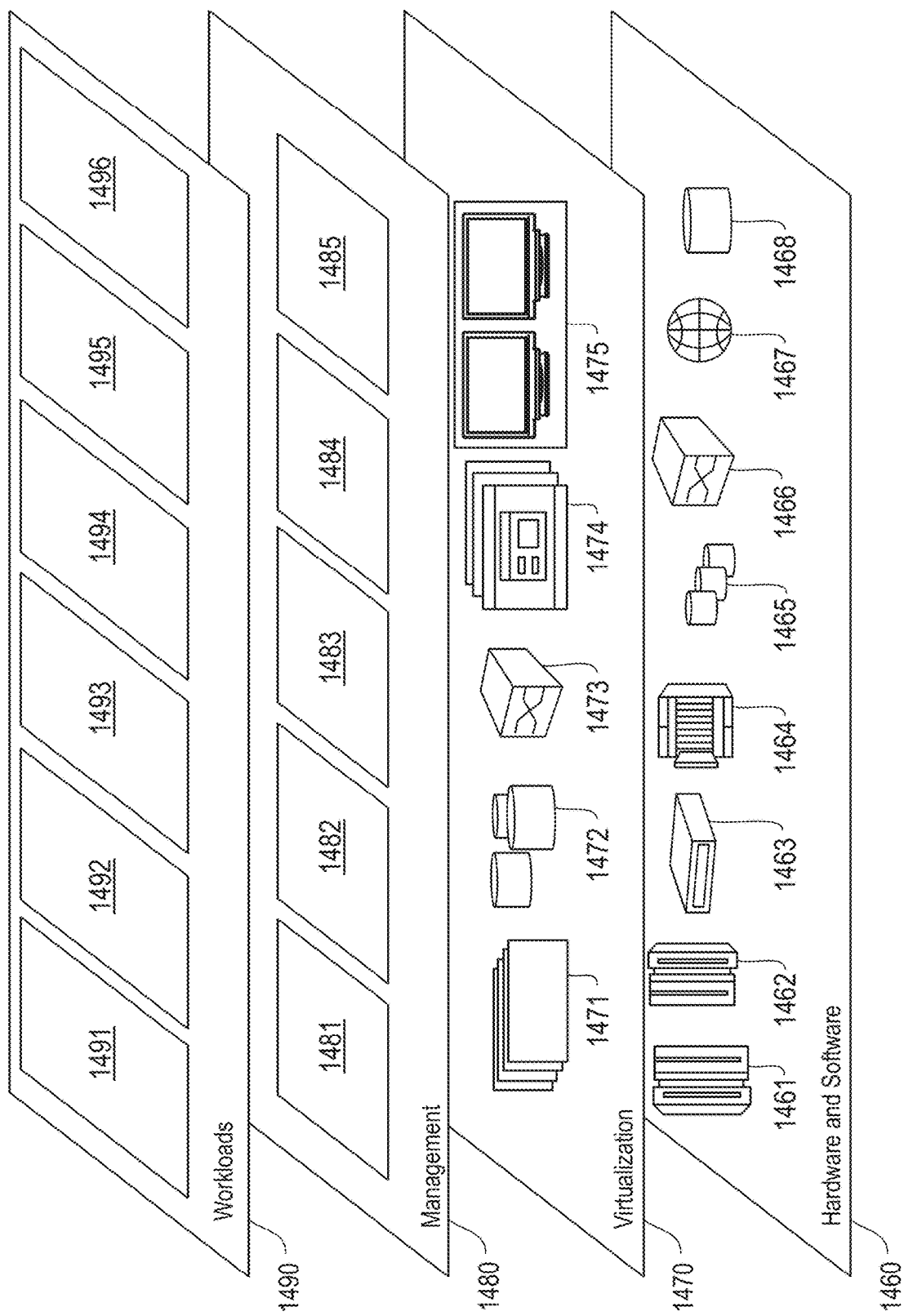
FIG. 14 depicts abstraction model layers, according to an exemplary embodiment of the present invention.

Referring now to FIG. 14, a set of functional abstraction layers provided by cloud computing environment 1350 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1460 includes hardware and software components. Examples of hardware components include: mainframes 1461; RISC (Reduced Instruction Set Computer) architecture based servers 1462; servers 1463; blade servers 1464; storage devices 1465; and networks and networking components 1466. In some embodiments, software components include network application server software 1467 and database software 1468.

Virtualization layer 1470 provides an abstraction layer from which the following examples of virtual entities may be provided: virtual servers 1471; virtual storage 1472; virtual networks 1473, including virtual private networks; virtual applications and operating systems 1474; and virtual clients 1475.

In one example, management layer 1480 may provide the functions described below. Resource provisioning 1481 provides dynamic procurement of computing resources and other resources that are utilized to perform tasks within the cloud computing environment. Metering and Pricing 1482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1483 provides access to the cloud computing environment for consumers and system administrators. Service level management 1484 provides cloud computing resource allocation and management such that required service levels are met. Service Level Agreement (SLA) planning and fulfillment 1485 provide pre-arrangement for, and procurement of, cloud computing resources for which a future requirement is anticipated in accordance with an SLA.

Workloads layer 1490 provides examples of functionality for which the cloud computing environment may be utilized. Examples of workloads and functions which may be provided from this layer include: mapping and navigation 1491; software development and lifecycle management 1492; virtual classroom education delivery 1493; data analytics processing 1494; transaction processing 1495; and automated learning execution 1496, which may perform various functions described above with respect to system 100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method, comprising:
   authenticating a plurality of users for an automated learning session, wherein the plurality of users correspond to at least one device, wherein said authenticating the plurality of users for the automated learning session comprises detecting the at least one device within a predetermined proximity of one or more other given devices;
   grouping at least a portion of the plurality of users into subsets based on criteria comprising (i) device type associated with the at least one device, (ii) determined commonalities between a plurality of learning models corresponding to one or more of the plurality of users, (iii) interaction context between one or more of the plurality of users and the at least one device, and (iv) proximity of at least a portion of the plurality of users to one or more of the other plurality of users; and
   providing the automated learning session for at least a portion of the subsets of the plurality of users, wherein said providing the automated learning session comprises:
   (i) analyzing the plurality of learning models corresponding to the one or more of the plurality of users;
   (ii) determining, based at least in part on the analysis, one or more activities to be performed by the at least a portion of the subsets of the plurality of users during the automated learning session; and
   (iii) executing the one or more activities on at least one device.

2. The computer-implemented method of claim 1, wherein the plurality of users correspond to a given device, and wherein the one or more activities are executed on the given device.

3. The computer-implemented method of claim 1, wherein the plurality of users correspond to at least a first device, and wherein the one or more activities are executed on at least a second device different from the first device.

4. The computer-implemented method of claim 1, wherein said analyzing the plurality of learning models comprises determining one or more common objectives shared by the plurality of users.

5. The computer-implemented method of claim 4, comprising:
   generating a micro-domain model for the plurality of users based on the one or more determined common objectives.

6. The computer-implemented method of claim 1, wherein the one or more activities comprise at least one of (i) a fill-in-the-blank activity, (ii) a positive/negative activity, and (iii) a concept grouping activity.

7. The computer-implemented method of claim 1, wherein said authenticating the plurality of users for the automated learning session comprises verifying one or more responses to one or more questions of at least one user of the plurality of users on a device used exclusively by another user of the plurality of users.

8. The computer-implemented method of claim 1, wherein said authenticating the plurality of users for the automated learning session comprises receiving an authentication input from at least two users of the plurality of users on the same device.

9. The computer-implemented method of claim 8, wherein said same device corresponds to a user different from the at least two users.

10. The computer-implemented method of claim 1, wherein said executing the one or more activities comprises receiving respective responses to a query from at least two users of the at least a portion of the subsets of the plurality of users via the same device during the automated learning session.

11. The computer-implemented method of claim 1, wherein said executing the one or more activities comprises providing the same query to the at least a portion of the subsets of the plurality of users.

12. The computer-implemented method of claim 11, wherein said providing the automated learning session comprises displaying responses of other users to the same query on a device of at least one user.

13. The computer implemented method of claim 1, wherein said providing the automated learning session comprises determining, based on one or more responses of the plurality of users to the one or more activities, one or more additional activities to be performed by the at least a portion of the subsets of the plurality of users during the automated learning session.

14. A computer program product, the computer program product comprising a computer readable storage medium having program instructions embodied therewith, the program instructions executable by a device to cause the device to:
   authenticate a plurality of users for an automated learning session, wherein the plurality of users correspond to at least one device, wherein said authenticating the plurality of users for the automated learning session comprises detecting the at least one device within a predetermined proximity of one or more other given devices;
   group at least a portion of the plurality of users into subsets based on criteria comprising (i) device type associated with the at least one device, (ii) determined commonalities between a plurality of learning models corresponding to one or more of the plurality of users, (iii) interaction context between one or more of the plurality of users and the at least one device, and (iv) proximity of at least a portion of the plurality of users to one or more of the other plurality of users; and
   provide the automated learning session for at least a portion of the subsets of the plurality of users, wherein said providing the automated learning session comprises:
   (i) analyzing the plurality of learning models corresponding to the one or more of the plurality of users;
   (ii) determining, based at least in part on the analysis, one or more activities to be performed by the at least a portion of the subsets of the plurality of users during the automated learning session; and
   (iii) executing the one or more activities on at least one device.

15. A system comprising:
   a memory; and
   at least one processor coupled to the memory and configured for:
      authenticating a plurality of users for an automated learning session, wherein the plurality of users correspond to at least one device, wherein said authenticating the plurality of users for the automated learning session comprises detecting the at least one device within a predetermined proximity of one or more other given devices;

grouping at least a portion of the plurality of users into subsets based on criteria comprising (i) device type associated with the at least one device, (ii) determined commonalities between a plurality of learning models corresponding to one or more of the plurality of users, (iii) interaction context between one or more of the plurality of users and the at least one device, and (iv) proximity of at least a portion of the plurality of users to one or more of the other plurality of users; and providing the automated learning session for at least a portion of the subsets of the plurality of users, wherein said providing the automated learning session comprises:
  (i) analyzing the plurality of learning models corresponding to the one or more of the plurality of users;
  (ii) determining, based at least in part on the analysis, one or more activities to be performed by the at least a portion of the subsets of the plurality of users during the automated learning session; and
  (iii) executing the one or more activities on at least one device.

16. The system according to claim 15, wherein in analyzing the plurality of learning models, the at least one processor is further configured for determining one or more common objectives shared by the plurality of users.

\* \* \* \* \*